US011936437B2

(12) United States Patent
Krajnc et al.

(10) Patent No.: US 11,936,437 B2
(45) Date of Patent: Mar. 19, 2024

(54) CONTEXTUAL CORRECTION OF WIRELESS SIGNAL-STRENGTH SENSING FOR TEMPERATURE COMPENSATION

(71) Applicant: SIGNIFY HOLDING B.V., Eindhoven (NL)

(72) Inventors: Hugo Jose Krajnc, Eindhoven (NL); Peter Deixler, Arlington, MA (US); Hendrik Stevens, Waalre (NL)

(73) Assignee: SIGNIFY HOLDING B.V., Eindhoven (NL)

(*) Notice: Subject to any disclaimer, the term of this patent is extended or adjusted under 35 U.S.C. 154(b) by 395 days.

(21) Appl. No.: 17/429,541

(22) PCT Filed: Feb. 4, 2020

(86) PCT No.: PCT/EP2020/052690
§ 371 (c)(1),
(2) Date: Aug. 9, 2021

(87) PCT Pub. No.: WO2020/164957
PCT Pub. Date: Aug. 20, 2020

(65) Prior Publication Data
US 2022/0140922 A1    May 5, 2022

(30) Foreign Application Priority Data
Feb. 14, 2019  (EP) .................................. 19157206

(51) Int. Cl.
*H04B 17/318*    (2015.01)
(52) U.S. Cl.
CPC .................. *H04B 17/318* (2015.01)

(58) Field of Classification Search
CPC ...... H04B 17/318; H04B 17/27; H04B 17/21; H04B 1/16; H04B 1/06; H04B 17/23;
(Continued)

(56) References Cited

U.S. PATENT DOCUMENTS

| 6,546,234 B2 | 4/2003 | Choe et al. |
| 7,890,065 B1 | 2/2011 | Liwinski |

(Continued)

FOREIGN PATENT DOCUMENTS

| CN | 1224281 A | 7/1999 |
| EP | 2615886 A1 | 7/2013 |

(Continued)

*Primary Examiner* — Golam Sorowar

(57) ABSTRACT

The invention is directed to a signal-strength compensating unit (100) for providing a temperature-compensated received-signal-strength indication value of a wireless signal (W) received by an external wireless receiver from an external wireless transmitter (106). It comprises a status determination unit (108) configured to ascertain operation condition data indicative of at least one current condition suitable for affecting a respective temperature of a wireless-signal reception unit (105) of the external wireless receiver or of a wireless-signal transmission unit (107) of the external wireless transmitter and a compensation-parameter determination unit (110) configured to determine and provide a signal-strength compensation parameter associated to one or more conditions suitable for affecting the respective temperature of the wireless-signal reception unit or of the wireless-signal transmission unit, and to determine a temperature-compensated received signal-strength indication value based thereon, without having to directly determine a temperature value.

14 Claims, 6 Drawing Sheets

(58) Field of Classification Search
CPC ........ H04B 17/24; H04B 17/309; H04B 1/02; H04B 10/116; H04B 17/30; H04B 17/373; H04B 1/1027; H04B 17/391; H04B 2001/0416; H04B 1/04; H04B 1/12; H04B 1/30; H04B 1/38; H04B 1/385; H04B 1/713; H04B 10/1143; H04B 17/0085; H04B 17/10; H04B 17/102; H04B 17/14; H04W 4/80; H04W 4/029; H04W 4/023; H04W 4/33; H04W 64/00; H04W 52/245; H04W 4/02; H04W 84/12; H04W 4/38; H04W 24/08; H04W 64/003; H04W 24/02; H04W 64/006; H04W 4/021; H04W 84/18; H04W 52/0245; H04W 4/025; H04W 4/70; H04W 52/283; H04W 52/242; H04W 52/52; H04W 4/027; H04W 4/024; H04W 4/026; H04W 48/20; H04W 52/18; H04W 52/383; H04W 8/005; H04W 12/08
See application file for complete search history.

(56) References Cited

U.S. PATENT DOCUMENTS

| | | |
|---|---|---|
| 9,209,913 B2 | 12/2015 | Li et al. |
| 2005/0179530 A1 | 8/2005 | Stewart et al. |
| 2008/0084169 A1 | 4/2008 | Wendt et al. |
| 2011/0243167 A1 | 10/2011 | Castillo et al. |
| 2014/0094133 A1* | 4/2014 | Li .................... H04B 17/21 455/226.2 |
| 2019/0250265 A1* | 8/2019 | Lu ..................... G01S 13/56 |
| 2021/0120516 A1* | 4/2021 | Wang .................. G01S 5/14 |
| 2022/0330384 A1* | 10/2022 | DeJonge ............. H04W 88/18 |
| 2023/0003830 A1* | 1/2023 | Haque ............... G01S 5/02525 |

FOREIGN PATENT DOCUMENTS

| | | |
|---|---|---|
| JP | H06230050 A | 8/1994 |
| JP | 2014035386 A | 2/2014 |
| JP | 2014071115 A | 4/2014 |
| JP | 2015005410 A | 1/2015 |
| WO | 2013053862 A1 | 4/2013 |

* cited by examiner

CONTEXTUAL CORRECTION OF WIRELESS SIGNAL-STRENGTH SENSING FOR TEMPERATURE COMPENSATION

CROSS-REFERENCE TO PRIOR APPLICATIONS

This application is the U.S. National Phase application under 35 U.S.C. § 371 of International Application No. PCT/EP2020/052690, filed on Feb. 4, 2020, which claims the benefit of European Patent Application No. 19157206.4, filed on Feb. 14, 2019. These applications are hereby incorporated by reference herein.

FIELD OF THE INVENTION

The present invention is directed to a signal-strength compensating unit, to a wireless receiver device, to a wireless network arrangement, to a presence-determination arrangement, to a method for operating a signal strength compensation unit and to a computer program.

BACKGROUND OF THE INVENTION

US 2014/0094133 A1 describes a temperature compensation method and apparatus for a received signal strength indicator (RSSI). To achieve accurate power values of the input signals of the RSSI under any temperatures, the characteristics of the RSSI under predefined three temperatures is measured, and an interpolation method is used to compensate for the temperature characteristics of the RSSI. The temperature compensation apparatus comprises a temperature sensor configured to measure a current temperature. A digital compensation module is configured to select, according to the current temperature, a temperature compensation coefficient from prestored temperature compensation coefficients corresponding to a normal temperature, a low temperature and a high temperature, and to perform temperature compensation on output signals of an RSSI value according to the selected temperature compensation coefficient.

SUMMARY OF THE INVENTION

It would be beneficial to reduce the hardware complexity of an apparatus for providing a temperature-compensated received-signal-strength indication value.

According to a first aspect of the present invention, a signal-strength compensating unit for providing a temperature-compensated received-signal-strength indication value of a wireless signal is disclosed. The signal-strength compensating unit comprises an input interface for receiving a received-signal-strength indication—hereinafter also referred to as RSSI-value of a wireless signal received by an external wireless receiver from an external wireless transmitter. The signal-strength compensating unit further comprises a status determination unit that is configured to ascertain operation condition data indicative of at least one current condition suitable for affecting a respective temperature of a wireless-signal reception unit of the external wireless receiver or of a wireless-signal transmission unit of the external wireless transmitter. Thus, the operation condition data is indicative only indirectly of an effect exerted by the respective temperature of the wireless-signal reception unit of the external wireless receiver or of the wireless-signal transmission unit of the external wireless transmitter incorporated in an amount of the received-signal-strength indication value.

The signal-strength compensating unit also comprises a compensation-parameter determination unit, which is configured to determine and provide one or more signal-strength compensation parameters. The signal-strength compensation parameter is associated to at least one of a plurality of conditions suitable for affecting the respective temperature of the wireless-signal reception unit or of the wireless-signal transmission unit. Also, the signal strength compensation unit comprises a compensation determination unit that is configured to determine, using the received signal-strength indication value, the ascertained operation condition data and the determined signal-strength compensation parameter, a temperature-compensated received signal-strength indication value, and to provide an output signal indicative thereof.

As is per se known in the art, the RSSI value is a value indicative of an amount of power present in a received wireless signal received at a specific frequency channel or band. The wireless signal is an electromagnetic signal having a frequency in a spectral range suitable for wireless communication, for instance in a radio frequency range or in a range of infrared or visible radiation. The RSSI value is determined by the wireless receiver. The invention is based on the recognition that the RSSI value is affected by temperature effects not only at the receiving end, but also at the transmitting end. Furthermore, the present invention recognizes that a current temperature of a wireless-signal reception unit of the external wireless receiver or of a wireless-signal transmission unit of the external wireless transmitter itself does affect the operation of the wireless receiver unit and of a wireless transmitter unit in a manner that influences the RSSI value determined at the receiving end, but that the temperature itself can also be described as an "indirect" effect that can be inferred from status information, i.e., information on current operation conditions that as such is known or can easily be determined. Based on this recognition, the present invention suggests to use such existing or easily available information of current operation conditions suitable for affecting a respective temperature of the wireless-signal reception unit of the external wireless receiver or of the wireless-signal transmission unit of the external wireless transmitter to determine a temperature compensation of the RSSI value. Thus, the signal-strength compensation unit of the present invention is advantageously configured to provide the temperature-compensated received-signal-strength indication value of a wireless signal without having to directly measure and without relying on an external temperature measurement.

According to the present invention, effects of temperature on the received-signal strength indication value are estimated based on ascertained operation condition data, which is indicative of at least one current condition suitable for affecting a respective temperature of a wireless-signal reception unit of the external wireless receiver or of a wireless-signal transmission unit of the external wireless transmitter. Thus, the operation condition data is indicative of a current context of operation of the external wireless transmitter or of the external wireless receiver. It is not data directly indicative of a temperature in units of temperature, as determined by a sensor that measures temperature by sensing physical effects of temperature, e.g., in a thermistor, thermocouple, or the like. Therefore, the present invention does not make use of such temperature sensors for compensating the received-signal-strength indication value.

Depending on the ascertained operation condition data, a signal-strength compensation parameter is determined which compensates the received-signal-strength indication value for expected temperature effects that are incorporated in the received-signal-strength indication value.

In the following, embodiments of the signal-strength compensation unit of the first aspect of the invention will be described.

The signal-strength compensation unit is in one embodiment implemented in hardware, suitably in the form of an application-specific integrated circuit (ASIC).

The signal-strength compensation unit is in some embodiments implemented as a stand-alone unit. As such, it is particularly suited for use in network arrangements. Also, embodiments of a wireless receiver device incorporating the signal-strength compensation unit will be described further below in the context of the second aspect of the invention.

In some embodiments, the signal-strength compensation unit is implemented by a programmable processor equipped with suitable executable computer program code for implementing the signal-strength compensation unit. A suitable computer program is described further below as a sixth aspect of the present invention.

In a variant of such embodiments, the programmable processor forms a processing unit that additionally implements functionalities other than that of the signal-strength compensation unit. For instance, a suitable form of such functional integration of the signal-strength compensation unit is in a baseband processing unit for use in a wireless receiver device. In some implementations of this kind, the baseband processing unit is additionally configured to determine the RSSI value of a wireless signal received by the external signal receiving unit. In such an implementation, the input interface of the signal-strength compensation unit is typically merely a functional separation between generating the RSSI value and determining the temperature-compensated received signal-strength indication value in accordance with the functionality of the signal-strength compensation unit.

Determination of the RSSI value before compensation can be performed according to any method known per se in the art. Different methods provide their results on different scales. The detailed amount of the compensation factor thus has to be adapted to the selected method of determining the RSSI value. In some embodiments, the received-signal-strength indication value to be compensated is indicative of an amount of wireless signal power present in a selected communication channel, preferably determined in accordance with a received-channel-power-indicator (RCPI) determination method as defined, for example, in the IEEE 802.11k-2008 protocol. The RSSI value before compensation is typically dependent on a specific hardware used, for instance a specific electrical circuitry for transmitting and receiving the wireless signal, of the wireless transmitter and the wireless receiver respectively.

In a particular embodiment, the compensation-parameter determination unit comprises a storage unit for storing one or more signal-strength compensation factors corresponding to respective values or values ranges of the at least one current condition suitable for affecting the temperature. The values are, in a particular embodiment, Boolean values indicative of, for example, an on-operational state or an off-operational state. The values are, in an another particular embodiment, alternatively or additionally, numerical values. In another embodiment, the signal-strength compensation values required for determining the temperature-compensated received signal-strength indication value are provided by an external unit. In other embodiments, the signal-strength compensation values are determined using predefined algorithms using the condition data as input parameters and providing the signal-strength compensation parameters as an output of performing the algorithm.

Preferably, the temperature-compensated RSSI value is obtained by applying one or more predetermined mathematical operations to the RSSI value received by the signal-strength compensating unit. In an embodiment, the signal-strength compensation parameters are factors that are applied as scaling or shifting factors of the received-signal-strength indication value in the frame of a linear function for determining the temperature-compensated received-signal-strength indication value. In another embodiment, the signal-strength compensation parameters are used in the frame of non-linear functions for determining the temperature-compensated received-signal-strength indication value, for instance as exponent values, logarithmic bases, etc.

In another embodiment of the signal-strength compensation unit of the first aspect, the status determination unit is configured to ascertain the operation condition data in the form of operation status data being indicative of a current operational state of the external wireless transmitter or of the external wireless receiver. Correspondingly, the compensation-parameter determination unit of this particular embodiment is configured to determine and provide the signal-strength compensation parameter in dependence on such ascertained operation status data.

A particularly advantageous variant is suitable for application in combination with an external wireless transmitter or an external wireless receiver that is included in an associated functional device. The functional device has in one exemplary embodiment a lighting function. In other embodiments, it has a heating function, or another function suitable for affecting the temperature of the wireless-signal transmission unit or of the wireless-signal receiving unit.

In such embodiments, the operational states of the wireless transmitter or of the wireless receiver suitably include a respective on-state and a respective off-state of the associated function, such as the lighting function. The status determination unit is thus configured to ascertain the operation condition data as data indicative of a current operational state of the functional device and to compensate the RSSI value by using a corresponding signal-strength compensation parameter that depends on the current operational state. In another variant, the operation status data is additionally indicative of a light intensity amount of the lighting function, which light intensity amount is also taken into consideration in determining the compensation factor.

In another embodiment, the operation status data is additionally or alternatively indicative of a time span during which the associated function of the wireless transmitter or receiver is being operated in the respective current operational state. For instance, in the case of a lighting device such as a luminaire incorporating a lighting function implemented, e.g., by an LED lighting unit, and the wireless transmitter, receiver or transceiver, the ascertained operation condition data is indicative of how long the lighting device has been in, for example, a current on-state of its lighting function. Operating a lighting unit generates heat energy, which propagates and is dissipated to different parts of the luminaire according to, among other factors, the respective shape, heat conductivity and heat capacity of the respective different parts. This results in a time dependence that can be described by a time constant and that is accounted for in the determination of compensation factor in the present embodiment. Accounting for a time dependence of temperature-related effects in affecting a respective temperature of a wireless-signal transmission unit or wireless-signal receiving unit improves the accuracy of RSSI compensation. Information on how long a lighting unit or other functional unit associated to the wireless transmitter or receiver has been operated in the on state is readily available and thus enables a more granular approach to temperature compensation of RSSI without determining the actual temperature. In another embodiment that incorporates a lighting unit, the operation status data is alternatively or additionally indicative of an intensity level of the emitted light, preferably as a function of time.

The operation status data is, in another embodiment, alternatively or additionally indicative of a type of device providing the associated function. In the case of lighting devices having a wireless transmitter and a lighting function associated thereto, the operation status data is indicative, for instance, of a corresponding light source, or luminaire or enclosure, all of which may have an impact on the RSSI. Also, the operation status data is, in a particular embodiment, indicative of a type of connector incorporated in the lighting device, since different types of connectors have different properties in terms of heat dissipation. For instance, lighting device connected using a GU10 connector is expected to dissipate less heat than a large pendant luminaire.

In another embodiment of the signal-strength compensation unit of the first aspect the status determination unit is additionally or alternatively configured to ascertain the operation condition data in the form of environment condition data indicative of an amount of air flow or an amount of a light intensity at the wireless-signal transmission unit or at the wireless-signal reception unit. Correspondingly, the compensation-parameter determination unit is configured to determine and provide the signal-strength compensation parameter in dependence on the ascertained environment condition data. The environment condition data is, in an embodiment, indicative of the amount of air flow or amount of light intensity directly at the wireless-signal transmission unit or at the wireless signal reception unit. In another embodiment, the environment condition is indicative of the amount of air flow or amount of light intensity that has not been determined directly at the wireless-signal transmission unit or at the wireless signal reception unit but that nevertheless is suitable for affecting their respective temperatures since it affects a nearby environment in which the wireless transmitter and the wireless receiver are placed.

In yet another embodiment, the status determination unit is additionally or alternatively configured to ascertain the environment condition data in the form of layout data pertaining to an installation position of the wireless transmitter, or of the wireless receiver with respect to existing heating-, ventilation- or air-conditioning devices, referred to as HVAC devices. This also provides a more granular approach to temperature compensation of RSSI. The layout data is thus indicative of how the wireless transmitter is installed with respect to HVAC outlets. Thus, in addition to considering a current operational state of the HVAC, the environment condition data is indicative of a distance amount between the wireless transmitter and the HVAC outlet or between the wireless receiver and the HVAC outlet or both.

An effect of temperature incorporated in the received RSSI is, in a particular embodiment, indirectly estimated based on the amount of air flow in a specific area, as opposed to being forced flown via HVAC. Non limiting examples of situations that may cause a change in the amount of air flow include a door being opened, e.g. for people to walk in in an office reception area, a garage door being opened, e.g. in a warehouse for a delivery truck to drive in, a window being open, e.g. in a room for ventilation, or even natural wind blowing on site and area applications, e.g. open air parking lots. Gust of winds caused by these situations can greatly influence the temperature of the wireless-signal reception unit of the external wireless receiver or of the wireless-signal transmission unit of the external wireless transmitter and as such introduce variations/miss detections when determining a received-signal-strength indication value.

These effects can be advantageously compensated by relying on environment condition data, for example based on a current state of external non-temperature sensors such as, but not limited to, open/close sensors or wind speed sensors.

In another embodiment, the layout data is additionally or alternatively indicative of an installation position of the wireless transmitter device or the wireless receiver device with respect to a floor or a ceiling on an environment or room where they are installed. This particular layout data provides thus information about a height at which the wireless transmitter or receiver device is operating. Height is a quantity that can affect the temperature at the wireless transmitter or receiver device, and this particular embodiment thus provides an increased granularity for temperature compensation of the RSSI value. In an embodiment, the wireless transmitter device, or the wireless receiver device or both are included in a free-hanging luminaire with lighting unit. During a commissioning step after installation, the layout information regarding the height at which the free hanging luminaire is stored either in the luminaire or in an external device, such as a lighting-control device. The operation status data is, in this embodiment, also indicative of the height value, and the strength-compensation parameter depend on the value of said height.

In another embodiment, the status determination unit is additionally or alternatively configured to ascertain the operation condition data in the form of time data indicative of a current date and time of day. Correspondingly the compensation-parameter determination unit is configured to determine and provide the signal-strength compensation parameter in dependence on the ascertained time data. For instance, thermal effects suitable for affecting a respective temperature of the wireless-signal reception unit of the external wireless receiver or of the wireless-signal transmission unit of the external wireless transmitter can also be inferred using the time data indicative of the current date and time. More preferably, the time data is used together with environment condition data, for instance based on data provided by light sensors, to determine what could be an expected amount of temperature variation due to light coming in, wherein the time data corrects for similar amounts of brightness but e.g. different angle over time between summer and winter.

The signal-strength compensation unit of the first aspect is in some embodiments a stand-alone device that can be connected in a suitable arrangement for receiving the required input data and providing its output signal indicative of the temperature-compensated received signal-strength indication value. In other embodiments, which will be described in the following in more detail, the signal-strength compensation unit is incorporated into another device such as a wireless receiver.

Thus, according to a second aspect of the present invention, a wireless receiver device is described. The wireless receiver device comprises a signal receiver unit configured to receive a wireless signal from an external wireless transmitter. It also comprises a received-signal-strength determination unit which is configured to ascertain and provide a received-signal-strength indication value pertaining to the received wireless signal, and a signal-strength compensating unit according to the first aspect of the present invention or to any of its embodiments. In the wireless receiver device of the second aspect, the input interface of the signal-strength compensating unit is configured to receive the ascertained received-signal-strength indication value.

The wireless receiver device of the second aspect includes a signal-strength compensating unit in accordance with the first aspect and thus shares its advantages or those of any of its embodiments.

In the following, embodiments of the wireless receiver device of the second aspect will be described.

In an embodiment, the wireless receiver device additionally incorporates a wireless transmitter configured to transmit wireless signals, and can thus be described as a wireless transceiver device, which includes the wireless signal receiving functionality.

In a preferred embodiment, the signal receiver unit is further configured to receive an operation condition signal indicative of the operation condition data that is to be ascertained by the status determination unit. In a particular embodiment, the operation condition signal is received wirelessly via a wireless-signal reception unit of the wireless receive which is also suitable for receiving the wireless signal. In another embodiment, operation condition signal is received via a wired connection. In another embodiment, operation condition signals are received wirelessly and via a wired connection.

In an embodiment according to the second aspect, the wireless receiver device further comprises a function unit that configured to be operated in a plurality of operational states. The function unit is for instance suitable for performing a lighting function or a heating function. The status determination unit is further configured to ascertain the operation condition data in the form of current operational state data indicative of a current operational state of the function unit, and the compensation-parameter determination unit is configured to determine and provide the signal-strength compensation parameter in dependence on the current operational state data.

The examples of operational state data described with reference to the first aspect of the invention are also applicable to the wireless receiver device of the second aspect.

An embodiment of the wireless receiver device comprises a compensation-parameter determination unit, which is configured to determine and provide at least one signal-strength compensation parameter associated to at least one of a plurality of conditions suitable for affecting the respective temperature of the wireless-signal reception unit. Thus, the status determination unit is advantageously configured to ascertain the operation condition data indicative of at least one current condition suitable for affecting the temperature of the signal receiving unit wireless receiver device.

According to a third aspect of the present invention, a wireless network arrangement is described. The wireless network arrangement comprises at least one wireless transmitter device configured to transmit a wireless signal and a wireless receiver device configured to receive the wireless signal and comprising a received-signal-strength determination unit configured to ascertain and provide a received-signal-strength indication value (RSSI) indicative of a received-signal-strength of the received wireless signal. The wireless network arrangement also comprises a signal-strength compensation unit in accordance with the first aspect of the invention, wherein the input interface of the signal-strength compensating unit receives the ascertained received-signal-strength indication value from the wireless receiver. Thus, the wireless network arrangement shares the advantages of the signal-strength compensating unit of the first aspect or of any of its embodiments.

The wireless network arrangement suitably uses operation condition data that is contextual data pertaining to conditions under which the different devices forming the wireless network arrangement are operated and that does not include temperature information, to compensate the received-signal-strength indication value received by the signal-strength compensation unit for expected temperature-caused effects incorporated in the amount of the received-signal-strength indication value.

In the following, embodiments of the wireless network arrangement of the third aspect will be described.

In an embodiment of the wireless network arrangement, the wireless received device is not a wireless receiver device in accordance with the second aspect of the invention, but rather a generic wireless receiver device or a wireless transceiver device. In another embodiment, the signal-strength compensation unit is incorporated in the wireless receiver device, and thus, the wireless receiver device of this particular embodiment is in accordance with the second aspect of the invention and any one of its embodiments.

In an embodiment of the wireless network arrangement of the invention, the wireless transmitter device or the wireless receiver device comprises a lighting unit for outdoor or indoor illumination, the lighting unit being operable in at least two operation modes including an off-operation mode and an on-operation mode. In this embodiment, the ascertained operation condition data is indicative of the current operation mode of the lighting unit und thus is indicative on whether the lighting unit is currently generating heat and affecting the temperature of a wireless-signal transmission unit of the wireless transmitter. The compensation determination unit is then advantageously configured to determine the temperature-compensated received signal-strength indication value in dependence on the operation condition data and thus on the current operation mode of the lighting unit.

In another embodiment, the operation condition data is further indicative of a current light intensity emitted by the lighting unit, or of a time span during which the lighting unit has been operated in the current operation mode or of both the light intensity and the time span, and the compensation determination unit is advantageously configured to determine the temperature-compensated received signal-strength indication value in further dependence on the current light intensity or on the time span or on both the light intensity and the time span.

In yet another embodiment, the wireless network arrangement of the third aspect further comprises at least one operation-condition sensing unit that comprises a sensor unit configured to provide an operation condition signal indicative of the operation condition data. In an embodiment, the operation condition data is in the form operation status data being indicative of a current operational state of the wireless transmitter device or of the wireless receiver device. In another embodiment, the operation condition data is alternatively or additionally in the form of environment condition data indicative of an amount of air flow or an amount of a light intensity at the wireless-signal transmission unit or at the wireless-signal reception unit.

In an embodiment, the sensor unit comprises a position sensor for determining whether a door or a window are in a closed state or in an open state, or an air-flow or wind sensor, or a light intensity sensor, or any combination thereof. In a particular embodiment, the wireless transmitter device, or the wireless receiver device or both the wireless transmitter device and the wireless receiver device comprise a respective operation-condition sensing unit.

In another embodiment, the wireless communication network comprises a plurality of signal-strength compensating units, either incorporated in a respective wireless receiver device, or as stand-alone device or both. In order to limit both traffic and computational resources, not all wirelessly connected devices need to participate in signal-strength determination and compensation. For example, in a wireless network arrangement comprises a plurality of wireless receivers in accordance to the second aspect of the invention, which are also configured to perform a lighting function, and are thus luminaires, only a fraction of the total number of luminaires can be, depending on an expected granularity/density of RSSI value determination and compensation. In general, there will be a portion of wireless receiver devices which are capable of performing compensation of RSSI but, while in operation, are not actively doing so.

This advantageously provides alternatives when the wireless transmitter devices or the wireless receiver devices are facing thermal issues. For instance, if a ceiling luminaire in an office, the ceiling luminaire being one of the wireless receiver devices, is close to an HVAC exit blowing warm air in winter, instead of providing a temperature-compensated received signal-strength indication value based on the determined signal-strength compensation parameter accounting for all of the mentioned thermal effects, the wireless network arrangement can suitably select another one of the wireless receiver devices for performing the compensation of the received RSSI. This selection is, in an embodiment, performed by a control device of the wireless network arrangement based on any combination of the following considerations:

operational state of the chosen wireless receiver device compared to the operational state of the discarded one;
historical data on usage of both wireless receiver devices;
expected thermal issues due to indirect aspects, e.g. mounted in area with lower external light coming in; or
location information regarding a proximity between the chosen wireless receiver device and other relevant wireless receiver or transmitter devices of the wireless network arrangement.

Another embodiment of the wireless network arrangement, comprises a plurality of wireless receiver devices arranged in an immediate vicinity, such as for instance a luminaire comprising a plurality of wirelessly connected lighting devices. A non-limiting example of such a luminaire is a fluorescent troffers featuring multiple tubular LE's (TLED) per single fixture. When an application running in the wireless network arrangement requires a certain lux level from the luminaire, this can be achieved by applying different dimming levels of the TLED. This embodiment of the wireless network arrangement is advantageously configured to select, for performing the compensation of the received RSSI and in order to decrease the thermal RSSI distortion, that wireless receiver device that is currently run at a lowest output power level, while the other wireless receiver devices in the immediate vicinity run at higher light output and hence temperature.

According to a fourth aspect of the present invention, a presence-determination arrangement is presented. The presence determination arrangement is suitable for detecting a presence of a foreign object in a reference environment and comprises a wireless network arrangement according to the third aspect of the present invention and a presence determination unit that is configured to receive, from the compensation determination unit of the signal-strength compensation unit, the output signal indicative of the temperature compensated received signal-strength indication value, to determine, whether the temperature compensated received-signal-strength indication value is correlatable to a presence of a foreign object in the reference environment and to provide a presence-detected signal indicative thereof.

The presence-determination arrangement is based on the fact that an analysis of variations of a received-signal-strength indication values is suitable for detecting features that can be mapped to motion or semi-static presence of beings or objects. However, the RSSI value received does not only depend on the presence or motion of objects or beings that may influence the received RSSI value. Changes in conditions that affect the respective temperature of the wireless-signal reception unit of the wireless receiver or of the wireless-signal transmission unit of the wireless transmitter cause temperature-induced deviations of the RSSI. Thus, the presence determination arrangement comprises a signal-strength compensating unit according to the first aspect for providing a temperature-compensated received-signal-strength indication value of a wireless signal. This provides an indirect temperature compensation to account for conditions suitable for affecting the respective temperature of a wireless-signal reception unit of the wireless receiver or of the wireless-signal transmission unit of the wireless transmitter, merely based on operation condition data that does not involve determining or ascertaining a temperature value.

In a particularly simple embodiment, the determination of whether the temperature compensated received-signal-strength indication value is correlatable to a presence of a foreign object in the reference environment includes comparing the received temperature compensated received signal-strength indication value with a predetermined detection threshold value associated with a transmission of the wireless signal within the reference environment under at least one pre-specified condition. In other embodiment, alternatives algorithms using the temperature-compensated received-signal-strength indication value are used by the presence determination unit. In an embodiment, the algorithm uses also the predetermined detection threshold value.

The predetermined detection threshold value is related to the received-signal-strength indication value determined by the wireless receiver device under the pre-specified condition. The pre-specified condition involves know values or value ranges of the condition or conditions that are expected to affect the temperature of the wireless-signal reception unit or of the wireless-signal transmission unit in the reference environment and may include, for example, any combination of a reference operational state of the transmitter or the receiver, an reference amount of air flow or a reference amount of a light intensity at the wireless-signal transmission unit or at the wireless-signal reception unit, or a reference time of day or of year. Deviations from these reference values or value ranges are susceptible of being compensated by the signal-strength compensation unit, depending on the ascertained operation condition data and on the respective signal-strength compensation parameters.

According to a fifth aspect of the present invention, a method for operating a signal-strength compensating unit for providing a temperature-compensated received-signal-strength indication value indirectly accounting for temperature effects affecting the received-signal-strength indication value. The method comprises:

receiving, from an external wireless receiver, a received-signal-strength indication value of a wireless signal received by the external wireless receiver from an external wireless transmitter;

ascertaining operation condition data indicative of at least one current condition suitable for affecting a respective temperature of a wireless-signal reception unit of the external wireless receiver or of a wireless-signal transmission unit of the external wireless transmitter, the operation condition data thus being indicative only indirectly of an effect exerted by the respective temperature of the wireless-signal reception unit of the external wireless receiver or of the wireless-signal transmission unit of the external wireless transmitter incorporated in an amount of the received-signal-strength indication value;

determining and providing a signal-strength compensation parameter, the signal-strength compensation parameter associated to at least one of a plurality of conditions suitable for affecting the respective temperature of the wireless-signal reception unit or of the wireless-signal transmission unit;

determining, using the received signal-strength indication value, the ascertained operation condition data and the determined signal-strength compensation parameter, a temperature-compensated received signal-strength indication value; and providing an output signal indicative thereof.

The method of the fifth aspect thus shares the advantages of the signal-strength compensation unit of the first aspect or of any of its embodiments According to a sixth aspect of the present invention a computer program is described. The computer program comprises instructions which, when the program is executed by a computer, cause the computer to carry out the method of the fifth aspect.

It shall be understood that the signal-strength compensation unit of claim 1, the wireless receiver device of claim 5, the wireless network arrangement of claim 7, the presence-determination arrangement of claim 12, the method of claim 13 and the computer program of claim 14, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
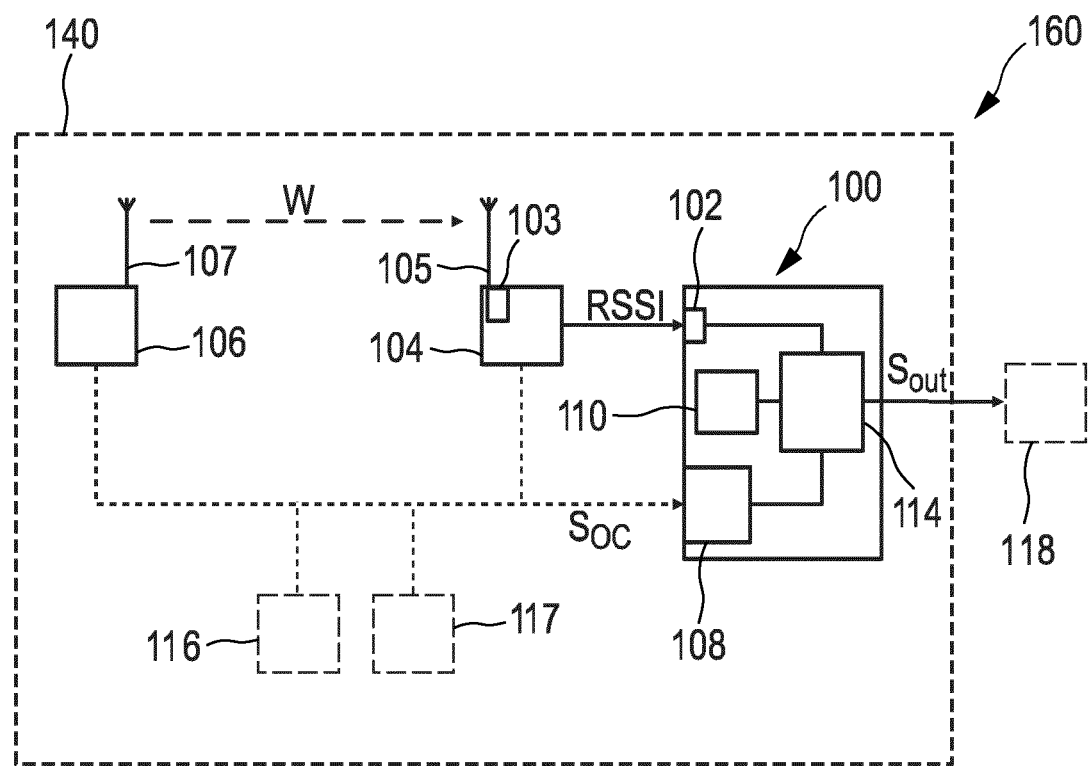
FIG. 1 shows a schematic block diagram representing an embodiment of a wireless network arrangement suitable for being part of a presence-determination arrangement.

FIG. 1 shows a schematic block diagram representing an embodiment of a wireless network arrangement 140 suitable for being part of a presence-determination arrangement 160. The wireless network arrangement comprises one wireless transmitter device 106 that is configured to transmit a wireless signal W. It also comprises a wireless receiver device 104 that is configured to receive the wireless signal W. The wireless signal is sent in accordance with a predetermined wireless communication protocol and it is not necessarily addressed at the wireless receiver device 104. In fact, the information content of the wireless signal is not particularly relevant for the presence-determination arrangement. The wireless receiver device 104 comprises a received-signal-strength determination unit 103 that is configured to ascertain and provide a received-signal-strength indication value RSSI indicative of a received-signal-strength of the received wireless signal W.

The wireless network arrangement also comprises a signal-strength compensation unit 100 for providing a temperature-compensated received-signal-strength indication value of the wireless signal W. The signal-strength compensation unit 100 includes an input interface 102 for receiving, from the wireless receiver device 104, the received-signal-strength indication RSSI value of the wireless signal W received by the wireless receiver device from the wireless transmitter device 106. The signal-strength compensation unit 100 also comprises a status determination unit 108 that is configured to ascertain operation condition data indicative of at least one current condition suitable for affecting a respective temperature of a wireless-signal reception unit 105 of the wireless receiver device or of a wireless-signal transmission unit 107 of the wireless transmitter device. The operation condition data is therefore indicative only indirectly of an effect exerted by the respective temperature of the wireless-signal reception unit 105 or of the wireless-signal transmission unit 107 incorporated in an amount of the received-signal-strength indication value Further, the signal-strength compensation unit 100 comprises a compensation-parameter determination unit 110, which is configured to determine and provide a signal-strength compensation parameter, the signal-strength compensation parameter associated to at least one of a plurality of conditions suitable for affecting the respective temperature of the wireless-signal reception unit or of the wireless-signal transmission unit, and a compensation determination unit 114 that is configured to determine, using the received signal-strength indication value, the ascertained operation condition data and the determined signal-strength compensation parameter, a temperature-compensated received signal-strength indication value, and to provide an output signal $S_{out}$ indicative thereof.

The status determination unit 108 is advantageously configured to receive an operation condition signal $S_{OC}$ indicative of the operation condition data. The operation condition signal is, in this particular exemplary wireless network arrangement 140 partially provided by the wireless transmitter device 106 and by the wireless receiver device 104.

Additionally, or alternatively, the operation condition signal, or a part thereof can be provided by an operation-condition sensing unit 116 or by a network-arrangement control device 117, such as for instance a switching unit, a router or a hub of the wireless network arrangement.

The part of the operation condition signal $S_{OC}$ provided by the wireless transmitter device 106 may for example include operation status data indicative of a current operational state of the external wireless transmitter. Additionally, or alternatively, it may comprise environment condition data indicative of an amount of air flow or an amount of a light intensity at the wireless-signal transmission unit 107, or also time data indicative of a current date and time of day.

Correspondingly, the part of the operation condition signal $S_{OC}$ provided by the wireless receiver device 104 may for example include operation status data indicative of a current operational state of the external receiver transmitter. Additionally, or alternatively, it may comprise environment condition data indicative of an amount of air flow or an amount of a light intensity at the wireless-signal reception unit 105, or also time data indicative of a current date and time of day.

The part of the operation condition signal $S_{OC}$ provided by the operation-condition sensing unit 116 may also comprise operation status data pertaining to one or both of the wireless transmitter and receiver devices 104, 105, to environment condition data or to time data.

The operation condition signal $S_{OC}$, or parts thereof, can be directly provided by the wireless transmitter device, or the wireless receiver device or the operation condition sensing unit 116 to the status determination unit. Alternatively, the operation condition signal, or parts thereof, can be provided by the network-arrangement control device 117, which is configured to monitor the network wireless arrangement and to ascertain the current status of one or more of the conditions suitable for affecting the respective temperature of the wireless-signal reception unit 105 or of the wireless-signal transmission unit 107.

The output signal $S_{out}$ can be advantageously provided to a presence determination unit 118 of the presence-determination arrangement 160. The presence determination unit is configured to detect a presence of a foreign object in a predetermined reference environment in which the transmitter device and the receiver device are installed. The determined received-signal-strength indication value depends, among other things, on the environment in which they are installed, i.e., the location of walls or other objects, the materials they are made of, etc. A presence of a foreign object in the reference environment may cause a change in the received-signal-strength indication value determined by the wireless receiver device. Thus, the presence determination unit is configured to receive, from the compensation determination unit 114 of the signal-strength compensation unit 100, the output signal indicative of the temperature compensated received signal-strength indication value. The presence determination unit is then configured to determine whether the temperature compensated received-signal-strength indication value is correlatable to a presence of a foreign object in the reference environment, for instance by comparing the received temperature compensated received signal-strength indication value with a predetermined detection threshold value associated with a transmission of the wireless signal within the reference environment under at least one pre-specified condition.

Deviations of a value of the least one current condition, e.g. operational state, environment condition, date and time, etc., larger than a predetermined respective deviation threshold with respect to respective reference value of the condition cause the provision of a respective signal-strength compensation parameter that changes the value of the received-signal-strength indication values resulting in the temperature-compensated received signal-strength indication value, where the effects cause by the presence or not of a foreign object in the reference environment are more easily identifiable.

The presence-determination unit is then configured to provide a presence-detected signal depending on said comparison. This will be further explained with reference to the examples depicted in FIGS. 3A-D.

Figure 2:
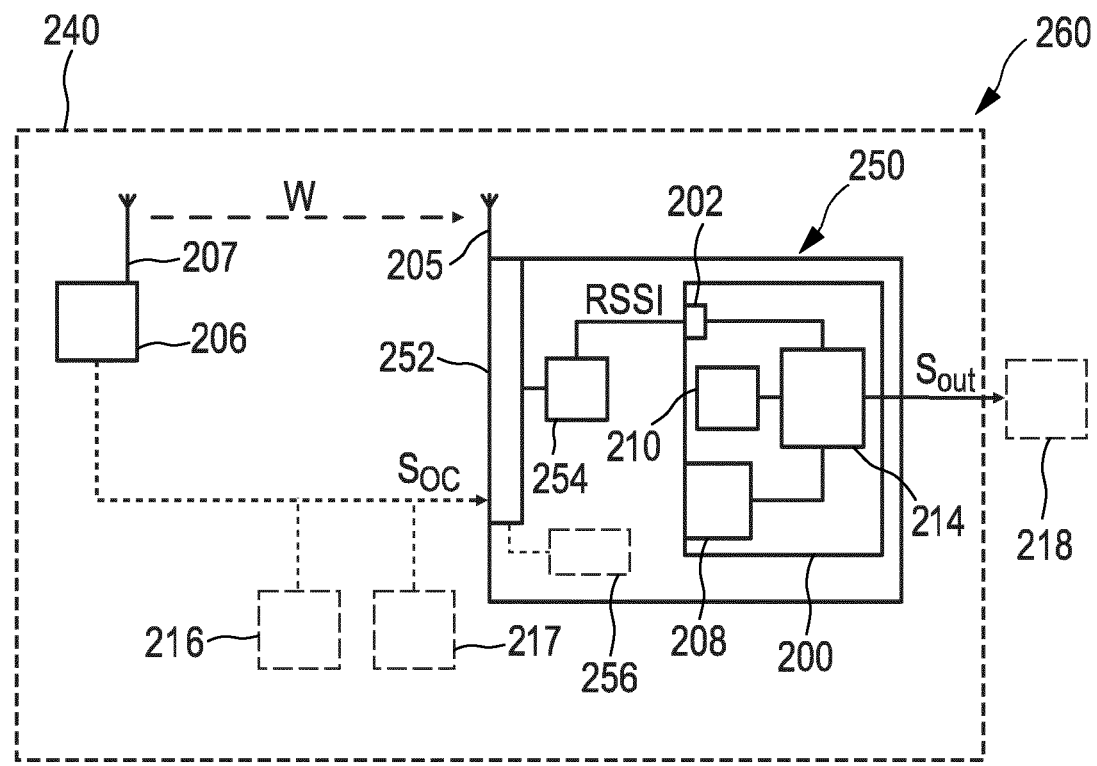
FIG. 2 shows a schematic block diagram representing another embodiment of a wireless network arrangement suitable for being part of a presence-determination arrangement, FIGS. 3A-D schematically show four different situations leading to different received-signal-strength indications values.

FIG. 2 shows a schematic block diagram representing another embodiment of a wireless network arrangement 240 suitable for being part of a presence-determination arrangement 260. The following discussion will focus on the difference between the wireless network arrangement 140 of FIG. 1 and the wireless network arrangement 240 of FIG. 2. Those features that are not altered are referred to using the same reference numerals except for the first digit, that is "1" for the wireless network arrangement 140 of FIG. 1 and "2" for the wireless network arrangement 240 of FIG. 2.

In the wireless network arrangement, the signal-strength compensation unit 200 is incorporated in to a wireless receiver device 250 forming an integral part of the wireless receiving device. The wireless receiver device 250 comprises a signal receiver unit 252 configured to receive the wireless signal W from the wireless transmitter device 206. It also comprises a received-signal-strength determination unit 254 that is configured to ascertain and provide a received-signal-strength indication value RSSI pertaining to the received wireless signal. It further includes the signal-strength compensating unit 200, wherein the input interface 202 of the signal-strength compensating unit 200 receives the ascertained received-signal-strength indication value RSSI.

The signal-strength compensation unit comprises a status determination unit 208 configured to ascertain operation condition data indicative of at least one current condition suitable for affecting a respective temperature of the wireless-signal reception unit 205 of the wireless-signal transmission unit 207.

The signal receiver unit 252 is also configured to receive the operation condition signal $S_{OC}$ from the wireless transmitter device 206, from an operation condition sensing unit 216, from a network-arrangement control device 217 or from any combination thereof. The operation condition signal $S_{OC}$ or parts thereof, can be received wirelessly via the wireless-signal reception unit, via a wired connection or via both the wireless-signal reception unit and the wired connection. Additionally, the operation condition data of a condition suitable for affecting the temperature of a wireless-signal reception unit 205 is, in an exemplary wireless receiver device, directly ascertained by the status determination unit 208 and not based on the operation condition signal $S_{OC}$.

Further, an as indicated by the dashed line, the wireless receiver device may additionally comprise a function unit 256 that is configured to be operated in a plurality of operational states. In this particular case, the compensation-parameter determination unit 210 is further configured to ascertain the operation condition data in the form of current operational state data indicative of a current operational state of the function unit and to determine the signal-strength compensation parameter in dependence on the current operational state data.

In an exemplary arrangement, the function unit 256 is a lighting unit for outdoor or indoor illumination, the lighting unit being operable in at least two operation modes including an off-operation mode and an on-operation mode. Here, the ascertained operation condition data is indicative of the current operation mode of the lighting unit.

Also, the wireless transmitter device can include a function unit, such as for instance, a lighting unit or a heating unit.

The operation mode of the function unit of the wireless receiver device or of the wireless transmitter device can affect the temperature of the respective the wireless-signal reception unit or of the wireless-signal transmission unit, and thus affect the RSSI value, as it will be explained in the following.

FIGS. 3A-D schematically show four different situations leading to different received-signal-strength indications values. FIGS. 3A-D show a wireless network arrangement 340 comprising a wireless transmitter device 306 and a wireless receiver device 304 that includes a signal-strength compensation unit (not shown). In general, both the wireless transmitter devices 106, 206 and 306 and the wireless receiver devices 104, 204, and 304 can also be wireless transceiver devices, configured to receive and transmit wireless signals. Both the wireless transmitter device 306 and the wireless receiver device 304 are installed at known fixed positions in a predetermined reference environment, such as a room.

Figure 3A:
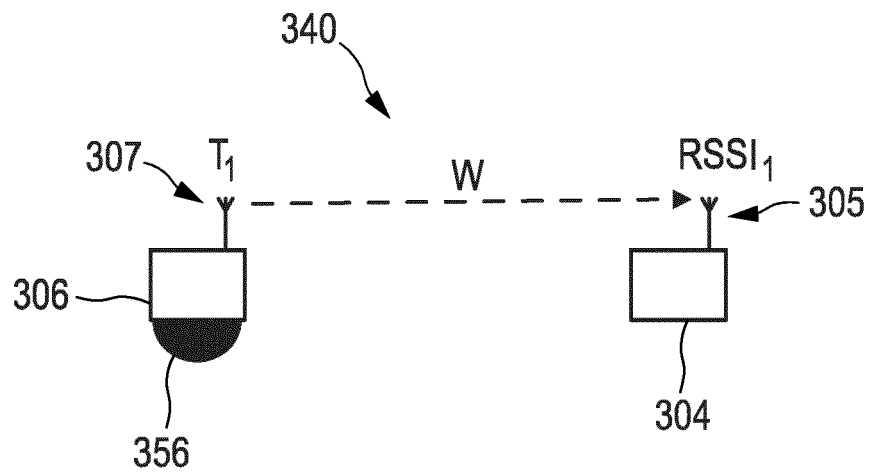
Figure 3B:
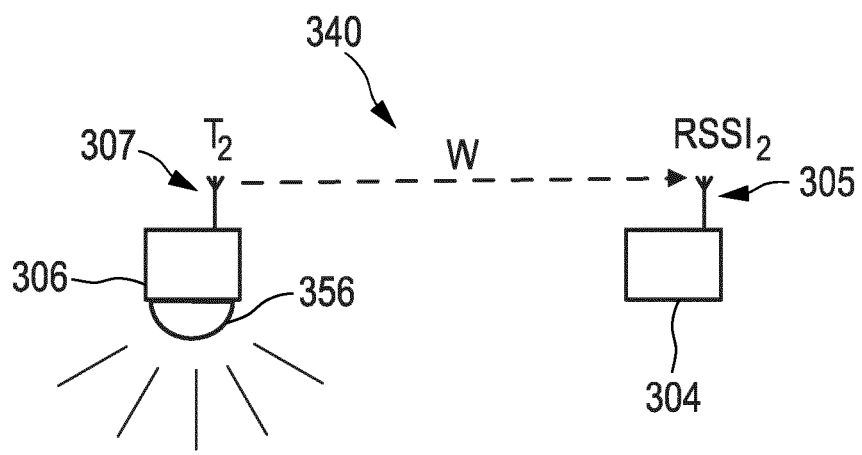
Figure 3C:
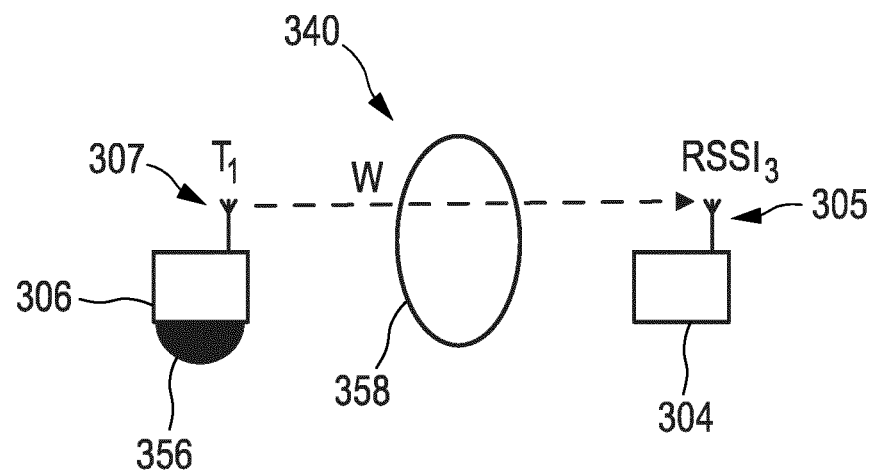
Figure 3D:
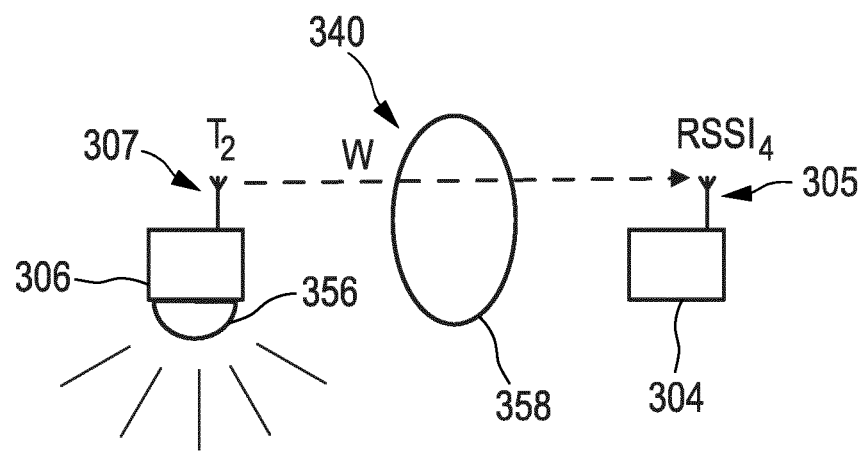

The wireless transmitter device 306 comprises a function unit in the form of a lighting unit 356. The lighting unit can be operated in different operation modes than include an on-operation mode, wherein the lighting unit emits light for illumination, and an off-operation mode, wherein the lighting unit does not emit light. FIGS. 3A and 3C show the lighting unit 356 being operated in the off-operation mode, whereas FIGS. 3B and 3D show the lighting unit 356 being operated in the on-operation mode. Since the lighting unit 356 and the wireless-signal transmission unit 307 are located close to each other, the temperature of the wireless-signal transmission unit will raise, when the lighting unit is operated in the on-operation mode compared to the temperature it has when the lighting unit is in the off-operation mode. The steady-state temperature of the wireless-signal transmission unit 307, when the lighting unit is operated in the off-operation mode, is given by $T_1$. In the case of the lighting unit being in the on-operation mode, the steady-state temperature of the wireless-signal transmission unit is given by $T_2$.

The determination of the received-signal-strength indication value RSSI is known to deviate as a function of temperature. This can be caused by e.g. expansion of substrates which lead to variations in track antenna's length, thermal shift of component values like RF matching circuits, crystals, etc. which lead to a deviated carrier frequency with respect to a center frequency of a selected band, etc. In some cases, variations could even be caused by localized pockets of hot or cold air. Another effect that is suitable for inducing changes in the RSSI is the presence of a being or object 358 that might absorb part of the energy of the wireless signal W, when compared to reference situation where the being or the object is not present. The object 358 is shown in FIGS. 3C and 3D. This can be advantageously used for detecting the presence of the object, using the RSSI value received by comparing the RSSI value received to a reference RSSI value indicative of the lack of presence of the object.

However, and as it has been explained above, temperate changes that affect the wireless-signal transmission unit 307 or the wireless-signal reflection unit can also modify the RSSI value determined by the wireless receiver device 305, and a compensation for temperature-induced changes on the RSSI value is needed to increase the significance of the determined RSSI value for detection of objects.

FIG. 3A shows a situation wherein the lighting unit has been in an off-state for a time long enough that the wireless-signal transmission unit 307 is at its steady-state temperature $T_1$. The wireless transmitter device provides a wireless signal with a predetermined signal strength. The wireless signal W is received at the wireless receiver device 304 where an RSSI value $RSSI_1$ is determined that depends, among other things, on the temperature of the wireless-signal transmission unit 307 and on the reference environment. In the case shown in FIG. 3C, an object 358 enters the reference environment. A portion of the signal energy of the wireless signal W, which in the case shown in FIG. 3A would reach the wireless receiver device is absorbed by the object 358. Therefore, the wireless signal received at the wireless-receiver device 304 has less signal energy than in the case shown in FIG. 3A, and the determined RSSI value $RSSI_3$ will be lower than the RSSI value determined in the case where there was no object 358, i.e. $RSSI_1$.

Thus, a presence determination unit, such as the presence determination unit 118 or 218 of FIGS. 1 and 2, could have as the predetermined detection threshold value a value based on $RSSI_1$, e.g., the value itself or including a tolerance margin, and compare the determined RSSI value $RSSI_3$ with the predetermined detection threshold value to determine whether or not a new or foreign object is present in the reference environment.

However, a similar effect on the received-signal-strength indication value determined at the wireless receiver device can be produced by a change of the temperature of the wireless-signal transmission unit 307, as shown in FIG. 3B. Here, the lighting unit 356 has been operated in an off-operation state for a time span long enough so that the wireless-signal transmission unit has reached a steady-state temperature given by $T_2$. The wireless transmitter device transmits the wireless signal with a signal strength that is lower than in the case shown in FIG. 3A due to the increased temperature of the wireless-signal transmission unit. Since the reference environment is the same as the one of FIG. 3A, the received-signal-strength indication value $RSSI_2$ determined at the wireless receiver device 305 will be lower than in the case shown in FIG. 3A.

The signal-strength compensation unit of the wireless receiver device ascertains operation condition data indicative of at least one current condition suitable for affecting the temperature of the wireless-signal transmission unit 307. The operation condition data is thus indicative only indirectly of an effect exerted by the temperature of the wireless-signal transmission unit 307 incorporated in the amount of the received-signal-strength indication value $RSSI_2$. The status determination unit ascertains, based for instance on an operation condition signal provided by the wireless-transmitter device (not shown), that the lighting unit 356 is in an on-operation mode. The compensation-parameter determination unit determines a signal-strength compensation parameter $F_1$ associated to the lighting unit 356 being in an on-operation state and the compensation determination unit uses the received signal-strength indication value $RSSI_2$, and the determined signal-strength compensation parameter $F_1$, to determine a temperature-compensated received signal-indication value, that is then suitable for being compared, by a presence determination unit, with the predetermined detection threshold value in order to determine whether a new or foreign object is present in the reference environment. In this case, for instance, the factor $F_1$, when applied to compensate the value of $RSSI_2$ for the temperature effect of the lighting unit being in an on-operation state on the wireless-signal transmission unit, results in a temperature-compensated received signal-strength indication value that is closer to the predetermined detection threshold value as $RSSI_2$. Thus, in this case, the presence determination unit would provide a presence-detected signal indicative of no presence being detected.

In the case shown in FIG. 3D, the received-signal-strength indication value $RSSI_4$ determined by the wireless receiver device 304 has been affected, when compared to the value of $RSSI_1$ shown in case of FIG. 1A by two distinct phenomena. On the one side, the wireless-signal transmission unit 307 is at a higher temperature $T_2$ due to the lighting unit being operated in the on-operation mode, which affects the signal strength of the provided signal. On the other hand, the presence of the object 358, which does not belong to the reference environment, causes a reduction of the RSSI value $RSSI_4$ determined at the wireless receiver device 304. The signal-strength compensation unit is advantageously configured to compensate, based on the ascertained operation condition data indicative of the lighting unit being in an on-operation mode, an expected effect of an increase of the temperature from $T_1$ to $T_2$ on the determined received-signal-strength indication value $RSSI_4$, without having to determine the actual temperature of the wireless-signal transmission unit 307.

The same applies to temperature-induced changes in the wireless-signal reception unit 305 (not shown). The wireless receiver device can further comprise a function unit, whose operation state may influence the temperature the wireless-signal reception unit 305.

A more granular approach can be achieved by using a respective signal-strength compensation function for, for instance, different light intensity amounts of the light emitted by the lighting unit, and considering that the higher the intensity amount, the higher the temperature effect. Additionally, or alternatively, operation condition data indicative of how much time the lighting unit has been operated in the current operation state offers increased granularity, since it accounts for a time-constant in the increase or decrease of the temperature after a change in the operation mode of the lighting unit.

Further, the actual positioning of the wireless transmitter device and the wireless receiver device in the reference environment, in particular with respect to hot air or cold air sources, such as HVAC outlets, or of wind sources, whose temperature statistically depends on a time of the day or of the year, such as for instance an open window, can affect the temperature of the wireless-signal reception unit or of the wireless-signal transmission unit.

Advantageously, the signal-strength compensation parameters associated to respective values or value ranges of the above mentioned quantities (operation mode, light intensity, air flow, time of day or year, combinations thereof) can be stored in a storage unit of the signal-strength compensation unit or in another external device.

Figure 4:
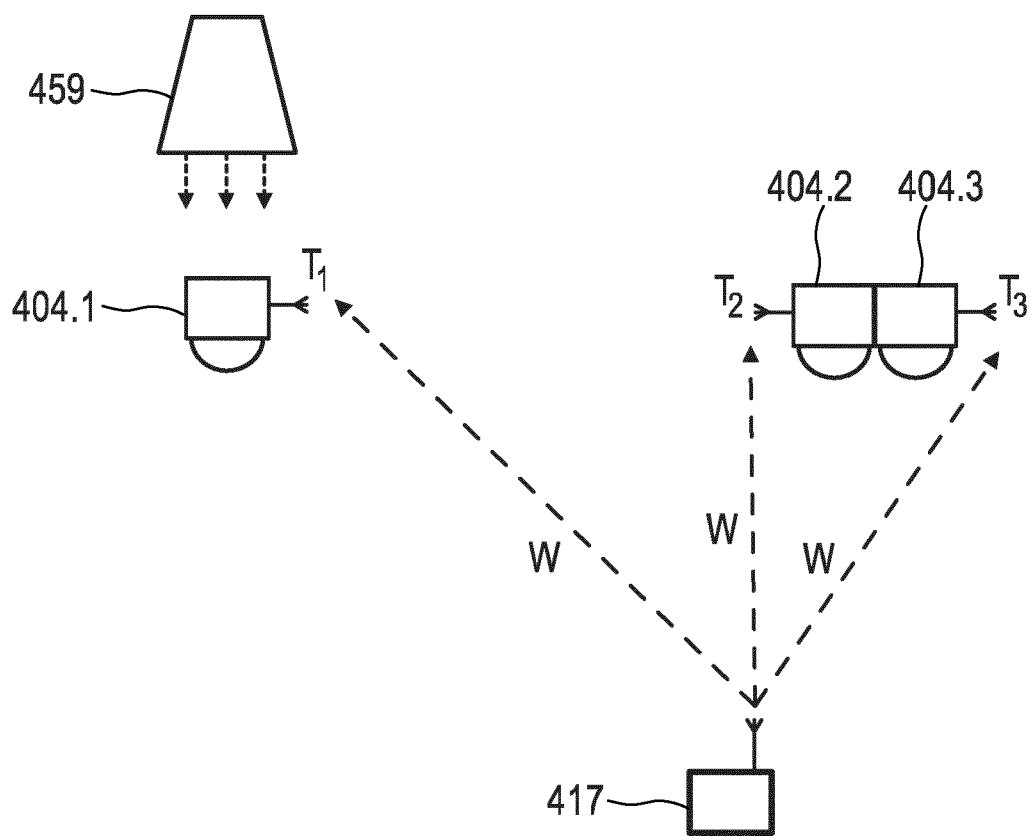
FIG. 4 shows a schematic block diagram representing another embodiment of a wireless network arrangement suitable for being part of a presence-determination arrangement.

FIG. 4 shows a schematic diagram of another embodiment of a wireless network arrangement 440 comprising a wireless transceiver device 417 configured as a network-arrangement control device and a plurality of wireless transceiver devices 404.1, 404.2, and 404.3, that are wireless receiver devices with regard to the received-signal-strength indication value that also include a lighting function unit. Each of the wireless receiver devices comprise a signal-strength compensation unit (not shown) and each is configured to provide a respective output signal indicative of the respective temperature-compensated received signal-strength indication value determined by each signal-strength compensation unit.

In the reference environment where the devices of the wireless network arrangement are installed, there is an HVAC outlet 459 which is configured, when operated, to provide hot air flow to the environment. The HVAC outlet is placed in a vicinity of wireless receiver device 404.1 so that when operated, the hot air flow affects the temperature $T_1$ of a wireless-signal reception unit of the wireless receiver device in a more pronounce manner than the temperatures $T_2$ and $T_3$ of the wireless receiver devices 404.2 and 404.3. The operation condition data is indicative of whether the HVAC outlet 459 is currently providing hot air flow or not. In this particular arrangement, the network-arrangement control device can instruct the wireless receiver device 404.1 to stop providing the temperature-compensated received-signal-strength indication value or to ignore the temperature-compensated received-signal-strength indication value provided by this particular wireless receiver device and use only that being determined and provided by the wireless receiver devices 404.2 or 404.3.

The wireless receiver devices 402.2 and 403.2 are lighting devices that are arranged in single fixture, so that when an application desires a certain light intensity level, this can be achieved by applying different dimming levels of the individual lighting units set by, for instance, the network-arrangement control device. In an advantageous wireless network arrangement, the network-arrangement control device 417 is configured to set the highest dimming level to that particular wireless receiver device 404.2 or 403.3 which is currently providing the temperature-compensated received-signal-strength indication value. Thus, the determination of the temperature-compensated received-signal-strength indication value is performed by that wireless receiver device operating at a lower output power lever in order to decrease a thermal-caused distortion of the RSSI value, while the other lighting units in the same fixture run at higher light output and hence temperature.

Figure 5:
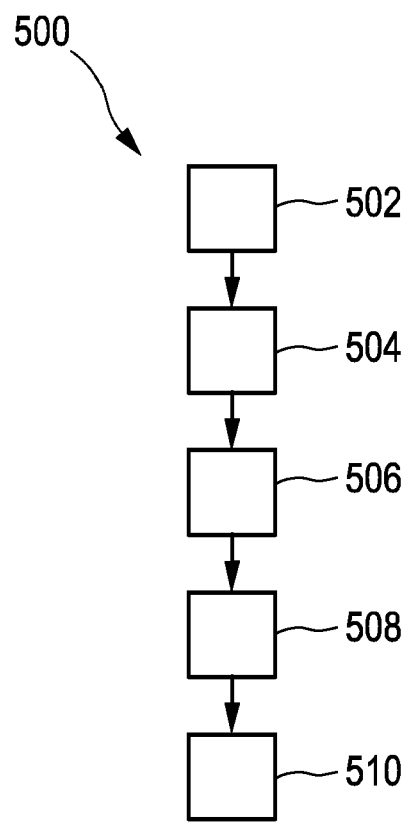
FIG. 5 shows a flow diagram representing an embodiment of a method for operating a signal-strength compensating unit.

FIG. 5 shows a flow diagram of an embodiment of a method 500 for operating a signal-strength compensating unit for providing a temperature-compensated received-signal-strength indication value of a wireless signal. The method comprises, in a step 502, receiving, from an external wireless receiver, a received-signal-strength indication RSSI value of a wireless signal received by the external wireless receiver from an external wireless transmitter. It also comprises, in a step 504, ascertaining operation condition data indicative of at least one current condition suitable for affecting a respective temperature of a wireless-signal reception unit of the external wireless receiver or of a wireless-signal transmission unit of the external wireless transmitter, the operation condition data thus being indicative only indirectly of an effect exerted by the respective temperature of the wireless-signal reception unit of the external wireless receiver or of the wireless-signal transmission unit of the external wireless transmitter incorporated in an amount of the received-signal-strength indication value. The method 500 also comprises, in a step 506, determining and providing a signal-strength compensation parameter, the signal-strength compensation parameter associated to at least one of a plurality of conditions suitable for affecting the respective temperature of the wireless-signal reception unit or of the wireless-signal transmission unit.

The method 500 also comprises, in a step 508, determining, using the received signal-strength indication value, the ascertained operation condition data and the determined signal-strength compensation parameter, a temperature-compensated received signal-strength indication value. Finally, the method 500 comprises, in a step 510 providing an output signal indicative of the temperature-compensated received signal-strength indication value.

In summary, the invention is directed to a signal-strength compensating unit for providing a temperature-compensated received-signal-strength indication value of a wireless signal received by an external wireless receiver from an external wireless transmitter. It comprises a status determination unit configured to ascertain operation condition data indicative of at least one current condition suitable for affecting a respective temperature of a wireless-signal reception unit of the external wireless receiver or of a wireless-signal transmission unit of the external wireless transmitter and a compensation-parameter determination unit configured to determine and provide a signal-strength compensation parameter associated to one or more conditions suitable for affecting the respective temperature of the wireless-signal reception unit or of the wireless-signal transmission unit, and to determine a temperature-compensated received signal-strength indication value based thereon, without having to directly determine a temperature value.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A signal-strength compensating unit for providing a temperature-compensated received-signal-strength indication value of a wireless signal, comprising:
    an input interface for receiving a received-signal-strength indication value of a wireless signal; received by the external wireless receiver from an external wireless transmitter;
    a status determination unit configured to ascertain operation condition data indicative of at least one current condition suitable for affecting a respective temperature of a wireless-signal reception unit of the external wireless receiver or of a wireless-signal transmission unit of the external wireless transmitter, the operation condition data thus being indicative only indirectly of an effect exerted by the respective temperature of the wireless-signal reception unit of the external wireless receiver or of the wireless-signal transmission unit of the external wireless transmitter incorporated in an amount of the received-signal-strength indication value;
    a compensation-parameter determination unit, which is configured to determine and provide one or more signal-strength compensation parameters, the signal-strength compensation parameters associated to at least one of a plurality of conditions suitable for affecting the respective temperature of the wireless-signal reception unit or of the wireless-signal transmission unit; and
    a compensation determination unit configured to determine, using the received signal-strength indication value, the ascertained operation condition data and the determined signal-strength compensation parameters, a temperature-compensated received signal-strength indication value, and to provide an output signal indicative thereof.

2. The signal-strength compensation unit of claim 1, wherein
    the status determination unit is configured to ascertain the operation condition data in the form of operation status data being indicative of a current operational state of the external wireless transmitter or of the external wireless receiver; and wherein
    the compensation-parameter determination unit is configured to determine and provide the signal-strength compensation parameter in dependence on the ascertained operation status data.

3. The signal-strength compensation unit of claim 1, wherein
    the status determination unit is configured to ascertain the operation condition data in the form of environment condition data indicative of an amount of air flow or an amount of a light intensity at the wireless-signal transmission unit or at the wireless-signal reception unit; and wherein
    the compensation-parameter determination unit is configured to determine and provide the signal-strength compensation parameter in dependence on the ascertained environment condition data.

4. The signal-strength compensation unit of claim 1, wherein;
    the status determination unit is configured to ascertain the operation condition data in the form of time data indicative of a current date and time of day; and wherein
    the compensation-parameter determination unit is configured to determine and provide the signal-strength compensation parameter in dependence on the ascertained time data.

5. A wireless receiver device, comprising:
    a signal receiver unit configured to receive a wireless signal from an external wireless transmitter;
    a received-signal-strength determination unit configured to ascertain and provide a received-signal-strength indication value pertaining to the received wireless signal; and
    a signal-strength compensating unit according to claim 1, wherein the input interface of the signal-strength compensating unit receives the ascertained received-signal-strength indication value.

6. The wireless receiver device of claim 5, further comprising
    a function unit configured to be operated in a plurality of operational states; wherein
    the status determination unit is configured to ascertain the operation condition data in the form of current operational state data indicative of a current operational state of the function unit; and wherein the compensation-parameter determination unit is configured to determine and provide the signal-strength compensation parameter in dependence on the current operational state data.

7. A wireless network arrangement, comprising:
at least one wireless transmitter device configured to transmit a wireless signal;
a wireless receiver device configured to receive the wireless signal and comprising a received-signal-strength determination unit configured to ascertain and provide a received-signal-strength indication value indicative of a received-signal-strength of the received wireless signal;
a signal-strength compensation unit according to claim 1, wherein the input interface of the signal-strength compensating unit receives the ascertained received-signal-strength indication value.

8. The wireless network arrangement of claim 7, wherein the wireless transmitter device or the wireless receiver device comprises a lighting unit for outdoor or indoor illumination, the lighting unit being operable in at least two operation modes including an off-operation mode and an on-operation mode; and wherein
the ascertained operation condition data is indicative of the current operation mode of the lighting unit.

9. The wireless network arrangement of claim 8, wherein:
the operation condition data is further indicative of a current light intensity emitted by the lighting unit, or of a time span during which the lighting unit has been operated in the current operation mode or of both the light intensity and the time span.

10. The wireless network arrangement of claim 7, further comprising:
at least one operation-condition sensing unit that comprises a sensor unit configured to provide an operation condition signal indicative of the operation condition data.

11. The wireless network arrangement of claim 10, wherein the wireless transmitter device or the wireless receiver device or both the wireless transmitter device and the wireless receiver device comprise a respective operation-condition sensing unit.

12. A presence-determination arrangement for detecting a presence of a foreign object in a reference environment, the presence determination arrangement comprising:
a wireless network arrangement according to claim 7 arranged in the reference environment; and
a presence determination unit configured:
to receive, from the compensation determination unit of the signal-strength compensation unit, the output signal indicative of the temperature compensated received signal-strength indication value;
to determine whether the temperature compensated received-signal-strength indication value is correlatable to a presence of a foreign object in the reference environment; and
to provide a presence-detected signal depending on said comparison.

13. A method for operating a signal-strength compensating unit for providing a temperature-compensated received-signal-strength indication value of a wireless signal, the method comprising:
receiving a received-signal-strength indication value of a wireless signal received by an external wireless receiver from an external wireless transmitter;
ascertaining operation condition data indicative of at least one current condition suitable for affecting a respective temperature of a wireless-signal reception unit of the external wireless receiver or of a wireless-signal transmission unit of the external wireless transmitter, the operation condition data thus being indicative only indirectly of an effect exerted by the respective temperature of the wireless-signal reception unit of the external wireless receiver or of the wireless-signal transmission unit of the external wireless transmitter incorporated in an amount of the received-signal-strength indication value;
determining and providing at least one signal-strength compensation parameter, the signal-strength compensation parameter associated to at least one of a plurality of conditions suitable for affecting the respective temperature of the wireless-signal reception unit or of the wireless-signal transmission unit;
determining using the received signal-strength indication value, the ascertained operation condition data and the determined signal-strength compensation parameter, a temperature-compensated received signal-strength indication value; and
providing an output signal indicative thereof.

14. A non-transitory computer readable medium comprising instructions which, when the instructions is executed by a computer, cause the computer to carry out the method of claim 13.

* * * * *